United States Patent
Saccone, Jr.

(10) Patent No.: US 10,912,420 B2
(45) Date of Patent: Feb. 9, 2021

(54) SLICING APPARATUS

(71) Applicant: Kevin James Saccone, Jr., Norwood, MA (US)

(72) Inventor: Kevin James Saccone, Jr., Norwood, MA (US)

(73) Assignee: Kevin J. Saccone, Jr., Medfield, MA (US)

(*) Notice: Subject to any disclaimer, the term of this patent is extended or adjusted under 35 U.S.C. 154(b) by 98 days.

(21) Appl. No.: 16/270,039

(22) Filed: Feb. 7, 2019

(65) Prior Publication Data
US 2020/0253423 A1    Aug. 13, 2020

(51) Int. Cl.
*A47J 43/07*    (2006.01)
*B26D 7/06*    (2006.01)
*B26D 3/26*    (2006.01)

(52) U.S. Cl.
CPC ............ *A47J 43/0722* (2013.01); *B26D 3/26* (2013.01); *B26D 7/0616* (2013.01)

(58) Field of Classification Search
CPC .............. B26D 2010/02; B26D 7/0616; A47J 43/0722; Y10T 83/6544; Y10T 83/6553
USPC .............................................. 83/411.2
See application file for complete search history.

(56) References Cited

U.S. PATENT DOCUMENTS

| | | | | |
|---|---|---|---|---|
| 2,398,230 A | * | 4/1946 | Keller | B23D 47/047 83/411.2 |
| 3,888,151 A | * | 6/1975 | Beckerer | B26D 7/0641 83/411.2 |
| 5,458,055 A | * | 10/1995 | Fitch, Jr. | A21C 9/04 83/703 |
| 2012/0024170 A1 | * | 2/2012 | Fritz-Jung | A21C 9/04 99/450.1 |
| 2012/0185086 A1 | * | 7/2012 | Khatchadourian | A21D 13/41 700/233 |

FOREIGN PATENT DOCUMENTS

EP    2532493 A1 * 12/2012    ........... B26D 7/0641

* cited by examiner

*Primary Examiner* — Daniel J Colilla (57) ABSTRACT

A food preparation system is provided. The food preparation system includes a slicing apparatus configured to host a plurality of different food items simultaneously and govern which of the ingredients are to be sliced.

9 Claims, 6 Drawing Sheets

SLICING APPARATUS

REFERENCE TO PRIOR FILING

The Present Application claims priority to the previously filed provisional application No. 62/627,268, filed on Feb. 2, 2018 and hereby incorporates the subject matter of the provisional application in its entirety.

BACKGROUND OF THE INVENTION

Field of the Invention

The present invention relates generally to food preparation. More particularly the present invention relates to a system and method that may automatically make a plurality of different food items with different ingredients based on an input.

SUMMARY OF THE INVENTION

The subject matter of this application may involve, in some cases, interrelated products, alternative solutions to a particular problem, and/or a plurality of different uses of a single system or article.

The present invention is an automated food preparation system. The food preparation system of the invention uses a computerized system (including a computer memory, processor, input, and an optional display, among others) to send commands to control and operate machinery designed to deposit ingredients by means of slicing the ingredients with a blade. These ingredients may be deposited onto a form of bread, or into a salad bowl, for example, as the bread or salad bowl moves along an assembly line.

The computer may receive production commands which it may then use to provide a signal or signals to direct the machinery for the selectively and controlled slicing by the food preparation system. These inputs may be received and processed in any manner. In one embodiment, the computerized system could receive input at the point of sale when a complete order is taken or entered. In this embodiment, the computerized system may be provided with all the necessary inputs to fulfill the order.

In another embodiment, the computerized system may receive input throughout the process of forming the food item. For example, input may be provided incrementally as customers move alongside their food item in the assembly line and choose which ingredients they want dispersed onto their food item as they watch it being made. This embodiment may require an integrated touch screen or substitutable input device that gives customers or employees the ability to choose which ingredients to dispense onto their food item from the machinery. This input device may be a digital touch screen, push buttons, or similar devices which may show the available options at each station and give customers the ability to choose which ingredients they want on their food item. The input may then be received by the computerized system, and generate a command sent to the equipment to instruct it to disperse the selected ingredients onto their food item. While the integrated touch screen (or other input device) will not be necessary in all applications of the invention, it may provide an interactive experience for customers which may be valuable to distract and engage customers while they are waiting for their food.

The primary aspect of the food preparation system outlined herein is a slicing apparatus which slices ingredients as the method of depositing them onto a piece of bread or other medium. The slicing apparatus is similar to a regular rotary slicer. However, rather than having items placed on a carriage to be sliced one at a time, the present invention holds multiple ingredients simultaneously in separate chambers within the apparatus. This apparatus has the capability of taking computer inputs and directing the apparatus to slice and to not slice particular ingredients without any changeover time to switch among different ingredients. The slicing apparatus can slice directly onto a sandwich or other food item traveling beneath the apparatus on a conveyor.

In use, the apparatus may revolve food items over a spinning slicer blade and an actuator such as a pneumatic or hydraulic piston, electric solenoid, or etc. may govern which food items within the chambers should be directed towards the blade to be sliced. Both the chassis which moves the ingredients and the slicer blade may be powered by an electronic motor and it need not be the same motor powering each component. The primary function of the slicing apparatus will be to take solid (unsliced) foods that get loaded into the chambers of the apparatus and slice them onto a sandwich or other food item based off of a customer's order. The apparatus may also be capable of further slicing some prepared foods, for instance slivered onions could be sliced into smaller pieces. The food within the chambers need not be whole for the revolving slicer to work.

Such a flexible, yet mechanized, manufacturing solution is currently not found in the food service industry where businesses typically rely on agile and adaptable human labor to deal with a high volume of special requests, variations and substitutions in orders. While mechanized food assembly lines do exist for mass production, they are only designed to make one particular item in large batches and require substantial effort or switching costs to modify the assembly line to make a new item. There is currently nothing that can satisfy the just in time manufacturing agility and adaptability of the present invention. The present invention may help restaurants and food service businesses reduce the cost of human labor, and the costs associated with human error such as order inaccuracies and portion controls by assembling food products such as sandwiches, wraps, burritos, and salads primarily by machine. It is important to note that an assembly line does not need to include all embodiments of this invention as the demand for certain equipment will vary for each restaurant and menu.

DETAILED DESCRIPTION

Referring now to the invention in greater detail.

Figure 1:
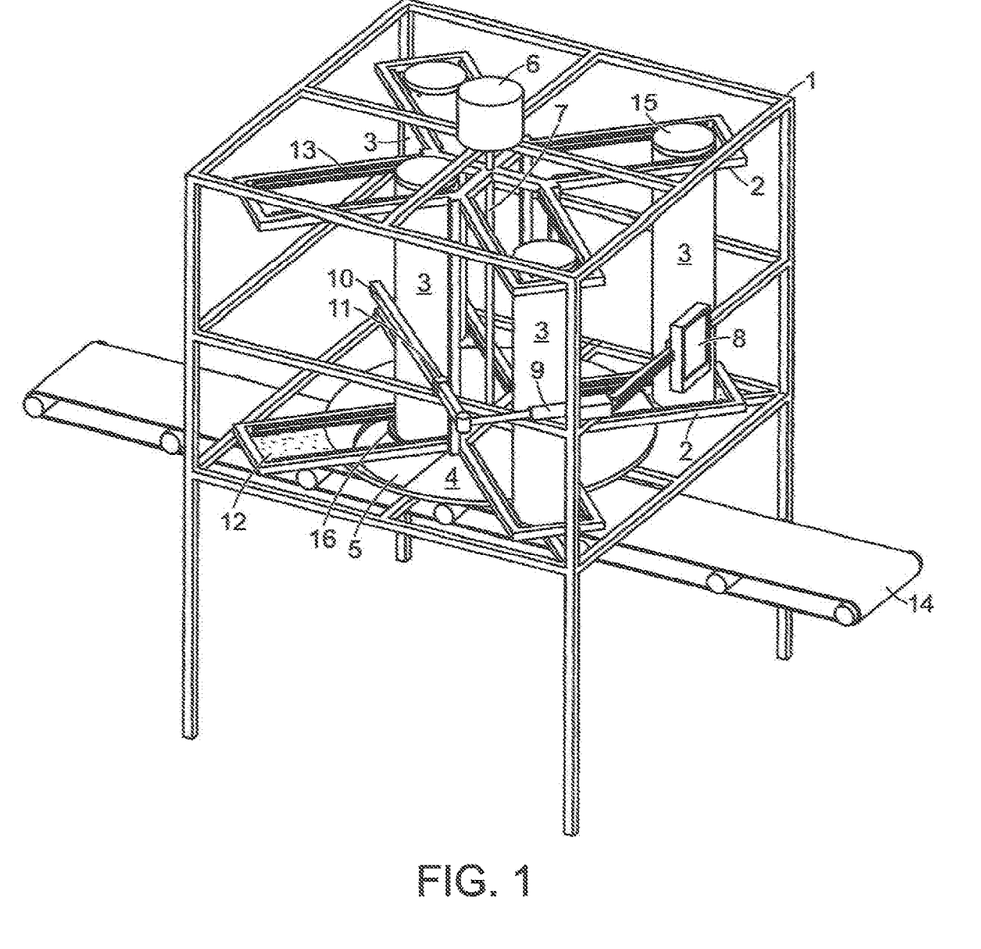
FIG. 1 is a view of an embodiment of the slicing apparatus according to the invention.

FIG. 1 shows a preferred embodiment of the slicing apparatus. A mounting bracket 1 positions the slicing apparatus over a conveyor 14. Above the conveyor is a blade guard 4, attached to the blade guard 4 is the blade 16 and the adjustable section of the blade guard 5. The adjustable section of the blade guard 5 is height adjustable to enable slicing at different thicknesses or if the height of the adjustable section of the blade guard 5 is brought to the same height or to a higher vertical plane of the blade 16 it will prohibit slicing because the ingredients will not make contact with the cutting edge of the blade 16. Adjacent to the blade guard 4 is a chassis 2 which hosts a plurality of ingredient chambers 3. The ingredient chambers 3 are open on the bottom, so the ingredients they host are capable of protruding out of the bottom of the chamber, and closed on the top with a lid 15. Note that the rotating portion of the blade guard 12 serves to contain the ingredient within the ingredient chambers 3 when they are in the outermost radial position and the rotating portion of the blade guard 12 is vertically aligned with the blade guard 4 so that the ingredient can slide from the rotating portion of the blade guard 12 and onto the blade guard 4 when the ingredient tube 3 is moved radially inward and vise versa when the ingredient tube 3 is moved radially outward. In this embodiment the chassis is capable of rotation and is powered by a motor 6 which rotates the drivetrain 7, which in turn rotates the chassis 2 in a manner that revolves ingredient chambers 3 around the center of the chassis 2. The motor 6 would also have a built-in encoder which would track the relative location of the drivetrain 7, which is keyed or secured to the chassis 2 and hence the rotational position of the ingredient chamber(s) 3 can be inferred by monitoring the rotational position of the driveshaft 7, and this can be done while the chassis 2 is in a state of rotation. The encoder or sensor which tracks the rotational speed and position of the ingredients within the chassis 2 need not be built into the motor 6 and could also be a separate entity that is in communication with the computerized controller 8. Depending upon the radial position of the ingredient chamber 3, the ingredient can protrude downwards out of the ingredient chamber 3 and come into contact with either the rotating portion of the blade guard 12, the blade guard 4, the adjustable section of the blade guard 5, or the blade 16 itself, depending on the radial position of the chamber 3 and also the rotational position of the chassis 2. The ingredient chambers 3 are capable of moving radially within the chassis on a track 13 which uses track followers or rollers to guide the ingredient tube 3 as it moves radially inwards and outwards. The apparatus governs which ingredients are to be sliced by using a piston 9 to move an engagement guide 10 to contact the desired ingredient chamber(s) and move them radially inwards towards the blade. The engagement guide 10 is attached to the mounting bracket 1 by the engagement guide mount 11. When the piston 9 is in an extended position, the engagement guide 10 angles itself inward towards the center of the apparatus. When the engagement guide 10 is angled inwards it will cause any ingredient chamber(s) 3 to move radially inwards as the chassis 2 rotates and brings the ingredient chamber(s) 3 into contact with the engagement guide 10. As the ingredient chamber 3 makes contact with the engagement guide 10 it will move from the rotating portion of the blade guard 12, to the blade guard 4, onto the adjustable section of the blade guard 5 and then into contact with the blade 16 where the ingredient gets sliced and can then return back to the rotating portion of the blade guard 12. If the piston 9 is contracted and hence the engagement guide 10 is not angled inwards, the ingredient chambers 3 will simply remain in the outermost position residing over the top of the rotating portion of the blade guard 12 the ingredients within the chambers 3 located in the outermost position of the chassis 2 will not come into contact with the blade 16 as the chassis 2 revolves the ingredient chambers 3. A computerized controller 8 with a touch screen is shown as a means of providing computer inputs to the apparatus, and of communicating with the encoder built into the motor 6 and in controlling the piston 9 as the primary means of governing which ingredients are to be sliced and which are not to be sliced. Note that the computer 8 with a touch screen could also receive inputs wirelessly or be part of a larger network of wired computerized controllers.

Figure 2:
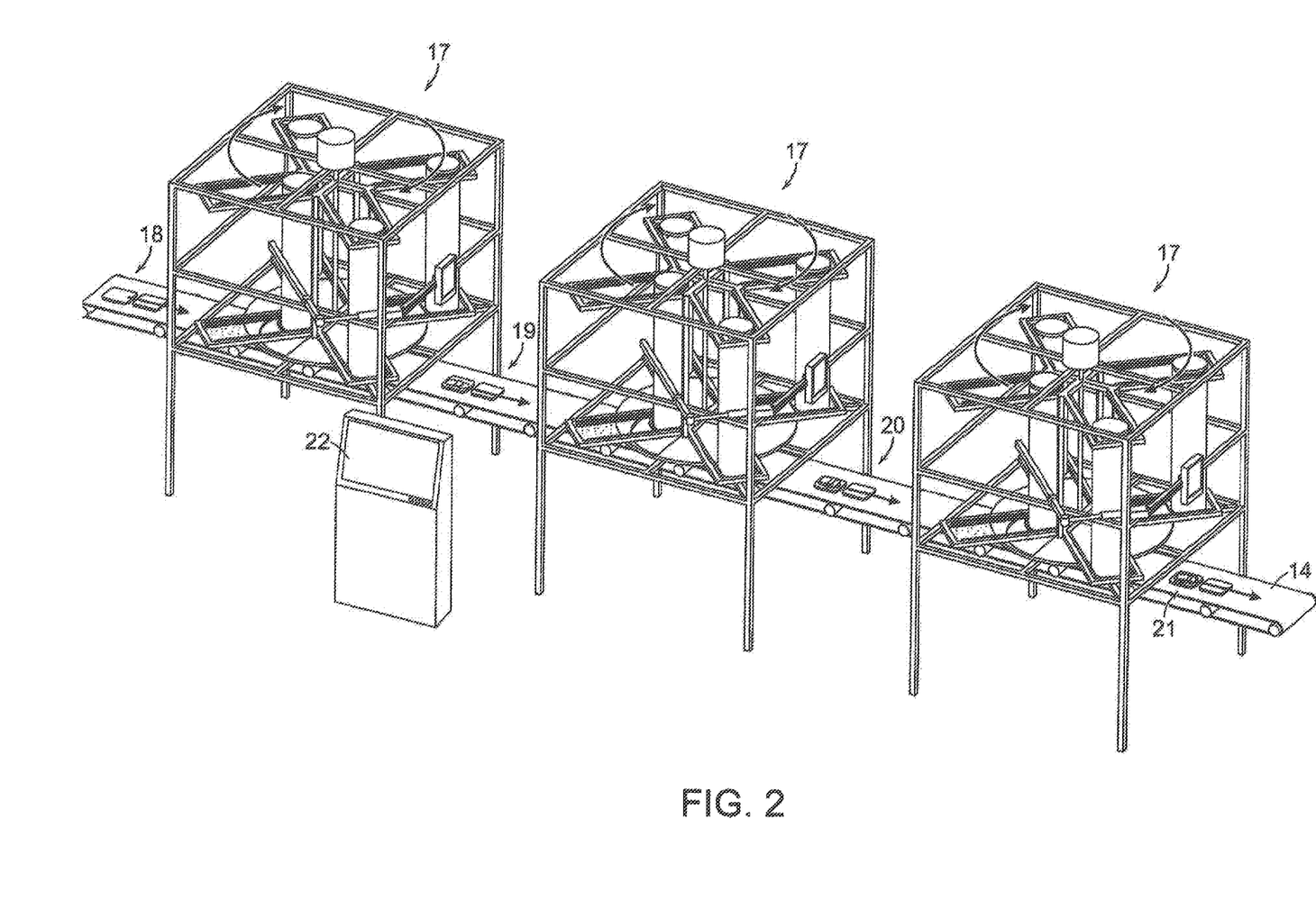
FIG. 2 is a view of three embodiments of the slicing apparatus being used together to make a sandwich according to the present invention.

FIG. 2 shows a series of three slicing apparatuses 17 being used to slice ingredients onto bread 18 building sandwiches as the bread 18 travels along the conveyor 14 beneath the slicing apparatuses 17. The leftmost slicing apparatus 17 is hosting produce ingredients, the middle slicing apparatus 17 is hosting meat and cold-cut ingredients, and the rightmost slicing apparatus 17 is hosting cheese ingredients. The ingredients need not be in this specific order nor are they limited to this selection. Likewise, meat, cheese, and produce could even be hosted in a single apparatus 17 but it is more practical to host them separately to avoid cross contamination of ingredients that could upset a customer's preferences, allergies or etc. since the same blade 16 slices all of the ingredients within each apparatus 17. In this arrangement, the conveyor 14 moves from left to right, first depositing produce ingredients, then meat ingredients and lastly cheese ingredients onto a potential sandwich. In this embodiment, the conveyor 14 starts with plain slices of bread 18, the bread slices 18 move under the leftmost slicing apparatus 17 to receive produce ingredients if they are desired for that particular sandwich. Slices of bread with produce on top of it 19 is shown in between the leftmost and middle slicing apparatuses 17. Slices of bread with produce and meat 20 is shown between the middle and rightmost slicing apparatuses 17. Towards the right end of the conveyor 14 there is bread with produce, meat and cheese 21 shown. Also shown is a point of sale computer 22 which provides computer inputs and commands to the slicing apparatus, using this a customer or employee could provide inputs to the slicing apparatuses 17 by selecting the ingredient they want deposited onto their particular sandwich. It is noted that the integrated touch screen will not be a necessary feature of many embodiments of this invention as some restaurants prefer to take an entire order at the point of sale computer 22, at which point all the needed inputs for the machinery may be gathered to fulfill the order and an integrated touch screen may not be necessary but there will still be a small computerized controller 8 located on or in close proximity to the apparatus. In some embodiments, for restaurants that prefer to keep their customer's entertained and distracted with the impulsive ability to choose their ingredients as they progress through a line potentially with a computerized controller 8 as seen in FIG. 1 in front of each slicing apparatus 17 displaying the options available for customers to choose from.

Figure 3:
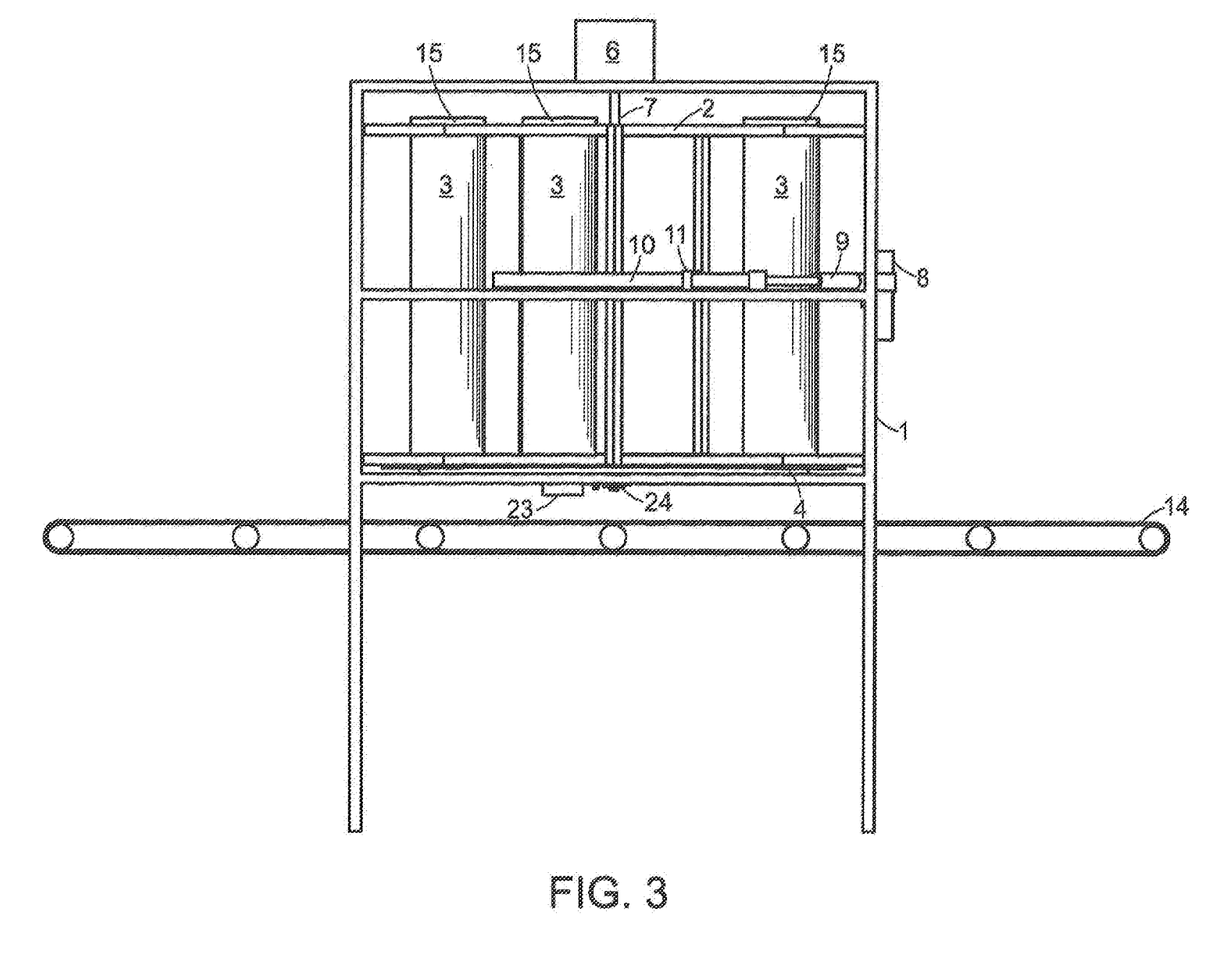
FIG. 3 is a side view of an embodiment of the slicing apparatus according to the present invention.

FIG. 3. Provides a side view of the preferred embodiment of the slicing apparatus. The ingredient chambers 3 depicted are essentially hollow cylindrical or polygonal tubes which may be made of either a food grade material such as aluminum, stainless steel, plastic, polymer or etc. ingredient chambers 3 may be fitted with electronic and/or mechanical structures to propel food items towards and/or away from the blade 16. The food items loaded into each ingredient chamber 3 are able to protrude from the bottom of the ingredient tube 3. Thus, for three slices 30 (Shown in FIG. 9) of a particular meat or ingredient, the ingredient chamber 3 hosting the particular meat or ingredient will revolve so that the chamber 3 passes over the blade three times in order to create three slices 30. In the preferred embodiment, the blade 16 and chassis 2 may continually spin, and their slicing may be controlled by managing the radial position of the ingredient chambers 3 within the slicing apparatus, by means of a piston 9. In FIG. 3 the use of a piston 9 being used with an engagement rod 10 is shown wherein the engagement guide 10 and piston 9 are secured to the mounting bracket 1, the engagement guide 10 is attached to the mounting bracket 1 by the engagement guide mount 11 which acts as a fulcrum and allows the engagement rod 10 to move radially inwards and outwards when the piston 9 expands and contracts. Just beneath the chassis is the blade motor 23 and the height adjustment mechanism 24 which enables the height adjustment of the adjustable section of the blade guard 5. The view provided in this figure also gives one an idea of the spacing that would exist between a conveyor 14 and the slicing apparatus, however, the spacing would be adjustable depending upon a number of factors.

Figure 4:
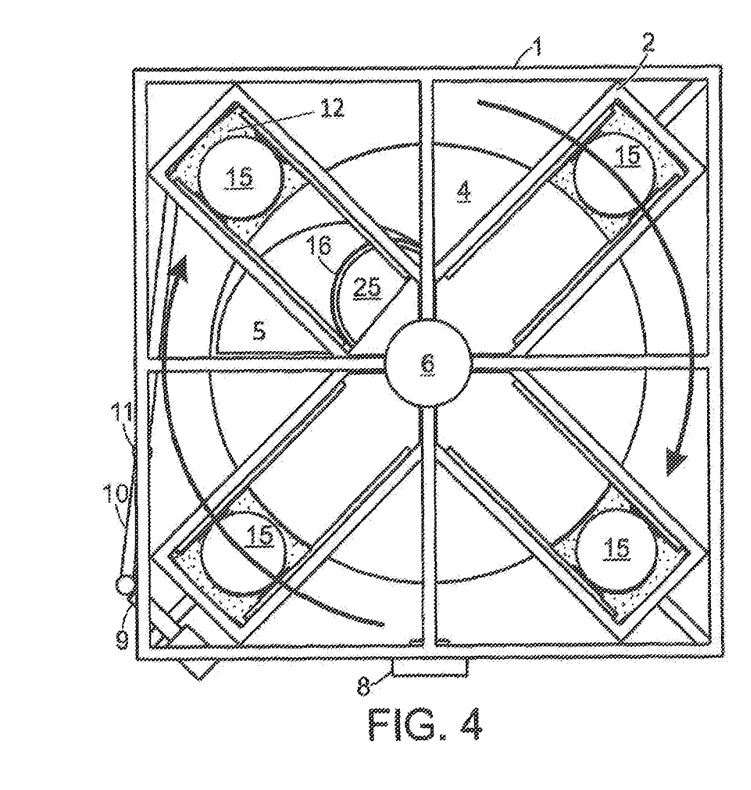
FIG. 4 is a top view of an embodiment of the slicing apparatus demonstrating the revolution of the chambers with the engagement rod in a non-slicing position.

FIG. 4 is a top view of the slicing apparatus which depicts the clock-wise rotation of the chassis 2 within the apparatus with the curved arrows, the rotation being driven by the motor 6. The piston 9 is contracted, putting engagement guide 10 in a non-slicing position where it would not direct the ingredient chamber(s) 3 radially inward to be sliced by the blade 16. This view demonstrates the operational relationship and general shape of the blade guard 4 and the adjustable section of the blade guard 5, as well as the four rotating sections of the blade guard 12 which are shaded slightly darker, the blade 16 and blade cover 25 which serves to cover and reduce friction over the middle and non-cutting portion of the blade 16.

Figure 5:
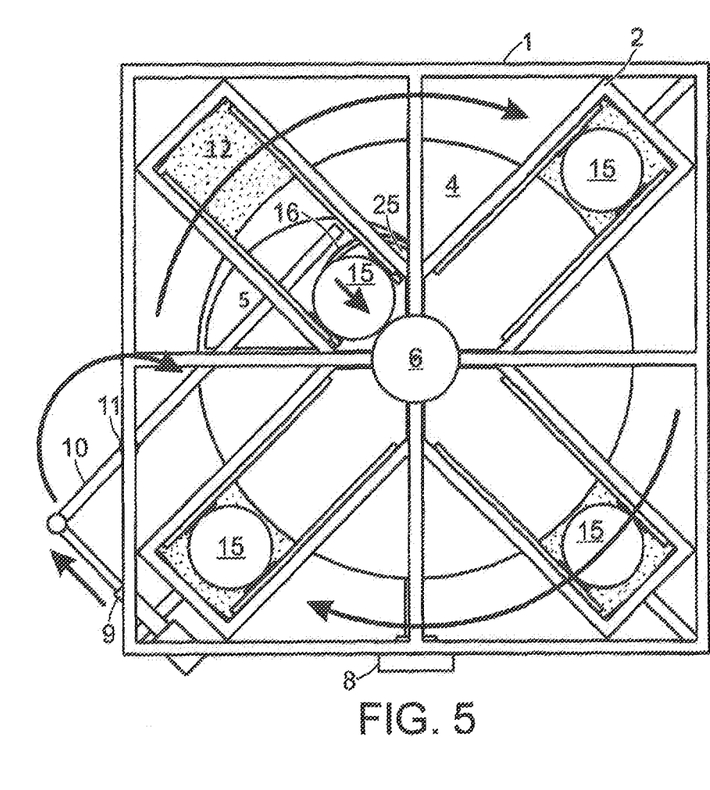
FIG. 5 is a top view of an embodiment of the slicing apparatus demonstrating the revolution of the chambers with the engagement rod in a non-slicing position.

FIG. 5 is a top view of a slicing apparatus which shows both the rotation of the chassis 2 and the movement of the piston 9 and engagement guide 10 with arrows. The ingredient chamber 3 in the upper left quadrant of the mounting bracket 1 has been moved radially inwards by the fully extended piston 9, which moves engagement guide 10 radially inwards to make contact with the ingredient chamber 3 and bring the ingredients hosted in the chamber into contact with the blade 16, note that the rotation of the chassis 2 is needed to finish moving the ingredient chamber 3 all the way across the blade and complete the slicing function.

Figure 6:
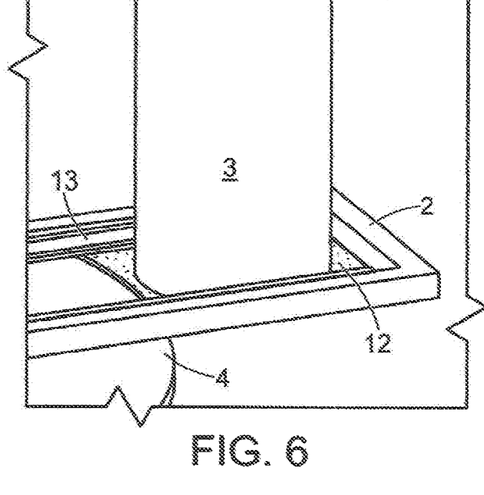
FIG. 6 shows an ingredient chamber positioned towards the outer edge of the chassis in a non-slicing position.

FIG. 6 shows a perspective view of the ingredient chamber 3 positioned towards the radial outer edge of the chassis 2. In this position the ingredient chamber 3 resides over the rotating portion of the blade guard 12. The rotating portion of the blade guard 12 is secured to the chassis 2 so that it rotates with the chassis. The purpose of this is to reduce friction and heat on the ingredients that reside within the ingredient tube 3 as the chassis rotates. A track 13 is shown as a mechanical device which allows movement of the ingredient chamber 3 radially inwards and outwards, track rollers are mounted to the sides of the ingredient chamber 3 and guided by the track 13. The rotating portion of the blade guard 12, is positioned on the same vertical plane as blade guard 4 to ensure that ingredients hosted within the ingredient tube 3 can slide effortlessly from the radial outward to the radial inward position and the reverse without getting snagged on either the edge of the blade guard 4 or the edge of the rotating portion of the blade guard 5. Also, the rotating portion of the blade guard 5 is placed close to blade guard 4, yet there is a small gap between the two so there is no friction as the chassis 2 and rotating portion of the blade guard 5 rotate and blade guard 4 stays fixed in position.

Figure 7:
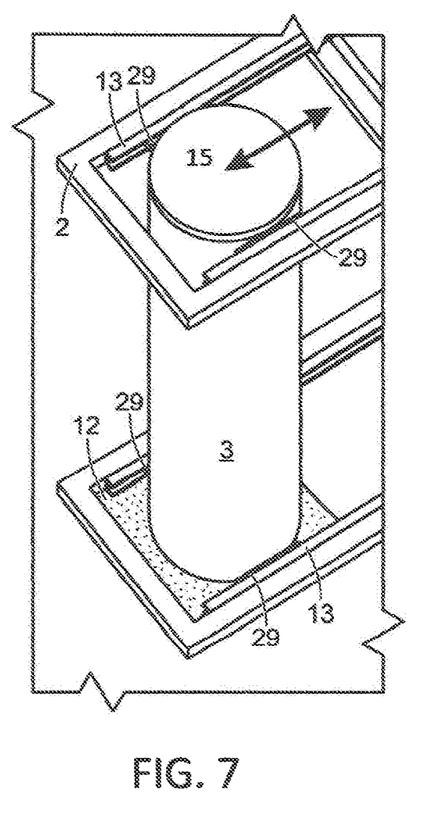
FIG. 7 shows the movement of the ingredient chambers radially.

FIG. 7 is another perspective view of the ingredient chamber 3 positioned towards the radial outer edge of the chassis 2. Wherein the radial movement of the ingredient chamber 3 is indicated by the arrows. A track 13 and track bracket 29 are used on the top and bottom of the ingredient tube 3 to provide support and guidance as the ingredient chamber 3 moves radially inwards and outwards. The track 13 is only one of a plurality of methods that could be used to enable the ingredient chamber 3 to move radially inwards and outwards. As the chassis 2 rotates, centrifugal force will naturally draw the ingredient chamber(s) 3 to a radial outward position and keep them away from the blade 16, unless they are directed towards the blade via contact with the engagement guide 10. In instances where the chassis 2 is rotated at a slow rate of speed and centrifugal force is not sufficient to return the ingredient chamber 3 to the radial outward position a mechanical device such as a spring could be used.

Figure 8:
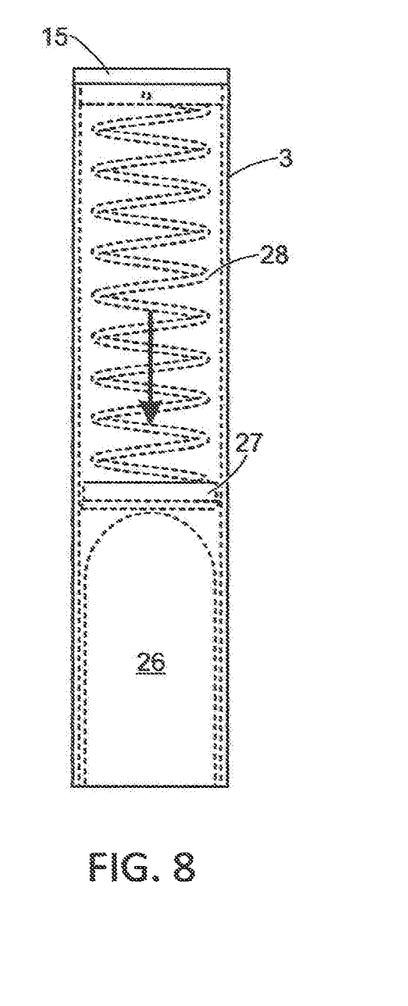
FIG. 8 shows a food ingredient being hosted inside an ingredient chamber.

FIG. 8 Depicts a transparent view of an ingredient chamber 3, filled with a food ingredient 26. A spring 28 is shown as one of the simplest of mechanical devices for applying downward force onto the food ingredient 26 while it remains in the ingredient chamber 3. The Spring 28 makes contact with the lid 15 and a buffer 27 to push the ingredients downwards in order to ensure consistent slicing within the apparatus.

Figure 9:
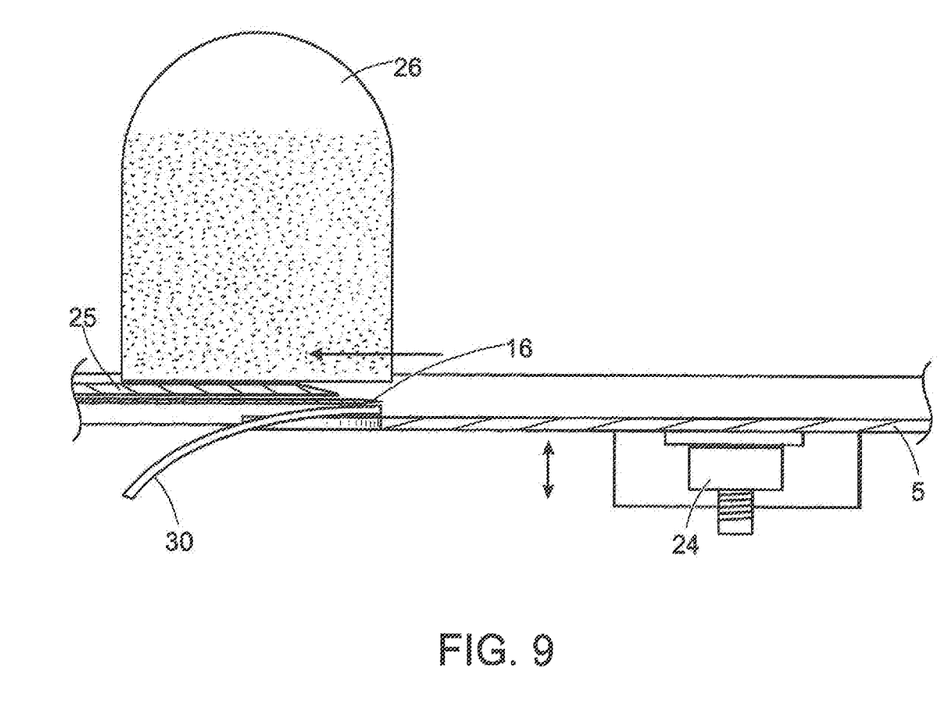
FIG. 9 shows a side view of the blade slicing a food ingredient.

FIG. 9 is a side view depicting the motion of the food ingredient 26 as it passes over the blade 16. To clearly illustrate this the ingredient chamber 3 which hosts the food ingredient 26 and several other parts have been made invisible. The horizontal arrow depicts the food ingredient 26 moving from right to left, from the adjustable section of the blade guard 5, into the blade 16, and then onto the blade cover 25, creating a slice 30 of the food ingredient in the process. The height adjustment mechanism 24 is used to adjust the height of the adjustable section of the blade guard 5 as a way of controlling the thickness of sliced food ingredients. If the distance between the blade 16 and the adjustable section of the blade guard 5 is greater, a thicker slice 30 will be produced, likewise the narrower the distance the thinner the slice 30. Also, it should be noted that the height adjustment mechanism can also be used to raise the adjustable section of the blade guard 5 level or above the cutting edge of the blade to prohibit any slicing. In this embodiment, the height adjustment mechanism would be tailored to the family of ingredients 26 being hosted in the slicing apparatus and would be initially set and then would not need to be touched during the operation of the slicing apparatus.

While the present invention has been presented in its preferred embodiment, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A slicing apparatus comprising:
a plurality of chambers for, respectively holding different food ingredients within the apparatus simultaneously;
a blade, used to slice food ingredients,
a chassis which hosts the chambers adjacent to the blade and moves the chambers in a reciprocating or revolving motion;
a computerized control system;
wherein the apparatus is configured to utilize the motion of the chassis to perform the slicing function and the computerized control system is configured to selectively move each of the chambers to bring the food ingredient in a respective chamber of the plurality of chambers into contact with the blade thereby slicing the food ingredient, whereby all, none, or any conceivable combination of the food ingredients that are within the chambers are sliced during each complete revolution or reciprocating motion of the chassis.

2. The slicing apparatus of claim 1, further comprising an actuator mounted adjacent to a side of the chassis which when activated moves a selected chamber of the plurality of chambers radially inward towards the blade, thereby slicing any ingredient located within said selected chamber.

3. A slicing apparatus comprising:
a blade, which slices food ingredients as they come into contact with an edge of the blade;
a plurality of chambers which are each capable of holding a food ingredient adjacent to the blade, the chambers being open at least on an end adjacent to the blade to allow each food ingredient to protrude from a respective chamber of the plurality of chambers;
a chassis, configured to rotate and host the chambers, wherein the chassis is configured to allow a radial position of each of the chambers to change while remaining secured to the chassis;
an actuator configured to selectively move a guide, wherein said guide is configured to manipulate a radial position of a selected one of the plurality of chambers while the chassis rotates.

4. The apparatus of claim 3 further comprising a computerized controller to control the actuator, whereby input or commands entered into the computerized controller selectively activate the actuator thereby selectively moving chambers radially inward and thereby determining which ingredients are sliced and which ingredients are not sliced.

5. The slicing apparatus of claim 4, wherein the apparatus governs which ingredients are to be sliced and which are not to be sliced without pausing or reversing the motion of the chassis.

6. The slicing apparatus of claim 3, further comprising a conveyor, wherein the slicing apparatus is configured to deposit sliced ingredients onto a bread, a bowl, or another medium as the bread, the bowl or the another medium moves on said conveyor beneath the slicing apparatus.

7. The slicing apparatus of claim 3 which has the ability to function while the chassis rotates in a single direction only; either clock-wise or counter clock-wise.

8. A slicing apparatus comprising:
a chassis configured to rotate on an axis, said chassis further configured to host a plurality of chambers that are configured to move radially while secured to the chassis; said chambers being configured to hold food ingredients;
a blade positioned below the chassis;
a bumper mounted adjacent to the chassis and configured to selectively manipulate the radial position of each chamber thereby selectively bringing a food ingredient located in a respective chamber of the plurality of chambers into contact with the blade thereby slicing the food ingredient;
wherein the apparatus governs which ingredients are sliced and which are not sliced by managing the bumper while the chassis is in a state of rotation.

9. A method of selectively slicing a plurality of ingredients comprising the steps of:
providing a chassis hosting a plurality of chambers, wherein each chamber is configured to hold an ingredient, and wherein the chassis is configured to rotate upon a fixed axis;
wherein the chassis is further configured to allow a radial position of each of the chambers to change;
providing a blade used to slice said ingredients, wherein when a selected chamber of said plurality of chambers is located in a relatively inward radial position, an ingredient located in said selected chamber will come into contact with said blade, and when said selected chamber is located in a relatively outward radial position, the ingredient in said selected chamber will not come into contact with said blade;
providing a motor used to rotate the chassis;
providing at least one actuator used to change a radial position of a selected chamber of said plurality of chambers, and any ingredient located in said selected chamber;
providing at least one encoder or sensor used to monitor a rotational position and speed of each of the chambers hosted within the chassis;
providing a computerized control system which is configured to control the actuator and is configured to communicate with the encoder,
wherein the computerized control system is configured to selectively activate the at least one actuator at the right instance in time so that the at least one actuator alters a radial position of a selected chamber of the plurality of chambers and an ingredient located therein and brings said ingredient into contact with the blade as the chassis is rotated by the motor.

* * * * *